(12) United States Patent
Preston et al.

(10) Patent No.: US 11,014,854 B2
(45) Date of Patent: May 25, 2021

(54) CERAMIC RADIATION DETECTOR DEVICE AND METHOD

(71) Applicant: Consolidated Nuclear Security, LLC, Oak Ridge, TN (US)

(72) Inventors: Jeffrey R. Preston, Knoxville, TN (US); Ashley C. Stowe, Knoxville, TN (US)

(73) Assignee: Consolidated Nuclear Security, LLC, Oak Ridge, TN (US)

(*) Notice: Subject to any disclaimer, the term of this patent is extended or adjusted under 35 U.S.C. 154(b) by 309 days.

(21) Appl. No.: 16/055,896

(22) Filed: Aug. 6, 2018

(65) Prior Publication Data
US 2019/0092693 A1    Mar. 28, 2019

Related U.S. Application Data

(60) Provisional application No. 62/541,990, filed on Aug. 7, 2017.

(51) Int. Cl.
| | | |
|---|---|---|
| C04B 35/547 | (2006.01) | |
| B28B 3/02 | (2006.01) | |
| C04B 35/645 | (2006.01) | |
| G01T 1/24 | (2006.01) | |
| G01T 1/203 | (2006.01) | |

(Continued)

(52) U.S. Cl.
CPC .......... *C04B 35/547* (2013.01); *B28B 3/025* (2013.01); *C04B 35/645* (2013.01); *C09K 11/623* (2013.01); *C09K 11/881* (2013.01); *G01T 1/2033* (2013.01); *G01T 1/24* (2013.01); *G01T 3/08* (2013.01); *C04B 2235/3203* (2013.01); *C04B 2235/3284* (2013.01); *C04B 2235/604* (2013.01); *C04B 2235/6567* (2013.01); *C04B 2235/6581* (2013.01); *C04B 2235/662* (2013.01); *C04B 2235/787* (2013.01)

(58) Field of Classification Search
None
See application file for complete search history.

(56) References Cited

U.S. PATENT DOCUMENTS

| | | | | |
|---|---|---|---|---|
| 4,765,931 A | * | 8/1988 | Saunders | G02B 1/02 252/584 |
| 6,504,156 B1 | * | 1/2003 | Takahara | C09K 11/7771 250/361 R |

(Continued)

OTHER PUBLICATIONS

O. Balachninaite, L. Petraviciute, M. Maciulevicius, V. Sirutkaitis, L. Isaenko, S. Lobanov, A. Yelisseyev, J.-J. Zondy; Absorptance and scattering losses measurements of the mid-infrared nonlinear crystals LiInSe2 and LiInS2 in the IR range.; ISSN 1392-2114 ULTRAGARSAS Nr.3(60). 2006.

(Continued)

*Primary Examiner* — Erin Snelting
(74) *Attorney, Agent, or Firm* — Clements Bernard Walker; Christopher L. Bernard

(57) ABSTRACT

A ceramic lithium indium diselenide or like radiation detector device formed as a pressed material that exhibits scintillation properties substantially identical to a corresponding single crystal growth radiation detector device, exhibiting the intrinsic property of the chemical compound, with an acceptable decrease in light output, but at a markedly lower cost due to the time savings associated with pressing versus single crystal growth.

20 Claims, 4 Drawing Sheets

(51) Int. Cl.
*G01T 3/08* (2006.01)
*C09K 11/62* (2006.01)
*C09K 11/88* (2006.01)

(56) References Cited

U.S. PATENT DOCUMENTS

| | | | |
|---|---|---|---|
| 7,288,224 B2* | 10/2007 | Ide | C23C 14/06 419/30 |
| 7,687,780 B2 | 3/2010 | Bell et al. | |
| 9,334,581 B2 | 5/2016 | Stowe et al. | |
| 9,459,357 B2 | 10/2016 | Shah et al. | |
| 9,482,763 B2 | 11/2016 | Vasilyev et al. | |
| 9,530,530 B2 | 12/2016 | Oike et al. | |
| 9,562,980 B2 | 2/2017 | Itaya et al. | |
| 9,567,519 B2 | 2/2017 | Winkler et al. | |
| 9,650,569 B1 | 5/2017 | Cohen et al. | |
| 9,678,225 B1 | 6/2017 | Feng et al. | |
| 2012/0192930 A1* | 8/2012 | Fox | H01L 31/03923 136/252 |
| 2013/0271610 A1* | 10/2013 | Rozenburg | C04B 35/6455 348/164 |
| 2013/0280855 A1* | 10/2013 | Moriya | H01L 21/02568 438/95 |
| 2014/0209805 A1* | 7/2014 | Stowe | G01T 1/2023 250/362 |
| 2015/0285924 A1* | 10/2015 | Stowe | C30B 29/46 250/473.1 |
| 2018/0178415 A1* | 6/2018 | Wang | B30B 11/002 |

OTHER PUBLICATIONS

L. Isaenko, A. Yelisseyev, S. Lobanov, A. Titov, V. Petrov, J.-J. Zondy, P. Krinitsin, A. Merkulov, V. Vedenyapin, J. Smironova; "Growth and properties of LiGaX2 (X—S, Se, Te) single crystals for nonlinear optical applications in the mid-IR"; Crys. Res. Technol. 38, No. 3-5, 379-387 (2003) / DO1 10.1002/crat.200310047.; 2003 Wiley-VCH Verlag GmbH & Co. KGaA, Wenheim 0232-1300/03/ 3-504-0379.

L. Isaenko, P. Krinitsin, V. Vedenyapin, A. Yelisseyev, A. Merkulov, J.-J. Xondy, and V. Petrov; "LiGaTe2: A New Highly Nonlinear Chalcopyrite Optical Crystal for the Mid-IR"; Crystal Growth & Design, vol. 5. No. 4 1325-1329, 2005.

Wisniewsky, D.J, et al. "Development of Novel Polycrystalline Ceramic Scintillators," IEEE Transactions on Nuclear Science. vol. 55, No. 3, Jun. 2008. pp. 1501-1508.

Neal, J. S., et al. "Investigation of ZnO-Based Polycrystalline Ceramic Scintillators for Use as α-Particle Detectors," IEEE Transactions on Nuclear Science. vol. 56, No. 3, Jun. 2009. pp. 892-898.

Cherepy, N.J., et al. "Transparent Ceramic Scintillators for Gamma Spectroscopy and MeV Imaging," SPIE Optical Engineering+ Applications, 95930P-95930P-7 (2015).

Cherepy, N.J., et al., "Development of Transparent Ceramic Ce-Doped Gadolinium Garnet Gamma Spectrometers," IEEE Trans. Nucl. Sci., 60, 3, 2330 (2013).

* cited by examiner

CERAMIC RADIATION DETECTOR DEVICE AND METHOD

CROSS-REFERENCE TO RELATED APPLICATION

The present patent application/patent claims the benefit of priority of U.S. Provisional Patent Application No. 62/541,990, filed on Aug. 7, 2017, and entitled "CERAMIC RADIATION DETECTOR DEVICE AND METHOD," the contents of which are incorporated in full by reference herein.

STATEMENT REGARDING GOVERNMENT SUPPORT

The U.S. Government has certain rights to the present disclosure pursuant to Contract No. DE-NA0001942 between the U.S. Department of Energy and Consolidated Nuclear Security, LLC.

FIELD OF THE DISCLOSURE

The present disclosure relates generally to a ceramic radiation detector device and method. More specifically, the present disclosure relates to a ceramic lithium indium diselenide or like radiation detector device formed as a pressed material that exhibits scintillation properties substantially identical to a corresponding single crystal growth radiation detector device, exhibiting the intrinsic property of the chemical compound, with an acceptable decrease in light output, but at a markedly lower cost due to the time savings associated with pressing versus single crystal growth.

BACKGROUND OF THE DISCLOSURE

Neutron detection is often utilized for nondestructive analysis (NDA) methods, where a deeply penetrating radiation is required to provide information from the internal structure of a target.

Neutron detectors typically fall into two categories depending on the energy of the neutrons required for analysis, where low energy or thermal neutrons are associated with capture based detectors and high energy or fast neutrons are associated with scattering based detectors. Thermal and epithermal neutron capture based detectors are often comprised of a compound including one or more of the following isotopes: He-3, Li-6, and B-10. He-3, being a noble gas, does not allow creation of solid materials, thus the number density of the associated detector is limited by the tube walls in a gas proportional counter. B-10 is possible for solid and gas detectors; however, $BF_3$ gas is toxic and its usage is limited. B-10 lined straw detectors are quite common for large portal monitor systems, where the mechanism is a gas proportional counter. B-10 packed semiconductors offer another means of detection similar to a compact semiconductor; however, these have had difficulty in production. Lithium-6 based capture in a scintillator is a common means of detection in $Cs_2LiYCl_6$:Ce (CLYC) crystals or as an additive into liquid scintillators that measure the resulting products rather than proton recoil.

One type of neutron detector is a scintillator. Scintillating material may be formed by single crystal growth through Bridgman, Czochralski, or other methods, as well as by ceramic production methods. In the realm of optical and radiation detector materials, ceramic treatment is rapidly becoming a method of choice for x-ray imaging systems and the like that do not require spectroscopic performance or high clarity. Recent advancements with the aluminum garnet family of materials exemplifies this approach, although with a material that readily lends itself to the method. For lithium indium diselenide and the like, on the other hand, the materials present some particular challenges with respect to constituent segregation that require particular ranges for the process variables. This inhibits flexibility, both as a single crystal and as a ceramic. For single crystal growth, a single boule grown by a vertical Bridgman process, for example, may take several weeks to complete, while a ceramic typically requires 1-2 days, with nearly the same performance. Ceramic productions are not in boule form, as with Bridgman growth, where the ceramic is produced in a mould form that can range from very small volumes to volumes as large as can be handled in a hot isostatic press (HIP) compartment. Aluminum garnets for use in high energy x-ray imaging applications have been demonstrated at dimensions of 12"×12"×1", which would be infeasible for a Bridgman or other boule-style growth.

Thus, what is still needed in the art is a process for the ceramic treatment of lithium indium diselenide and the like that allows its desirable properties to be fully exploited after a quicker formation time at a lower cost versus single crystal growth.

BRIEF SUMMARY OF THE DISCLOSURE

Lithium indium diselenide, for example, is a neutron detecting material that operates as both an intrinsic semiconductor and scintillator, and typically requires single crystal growth for the effective utilization of both of these modalities. Intrinsic materials require no dopants for activation centers. Traditionally, lithium indium diselenide has been grown by a vertical Bridgman process, requiring quartz ampules and a great deal of time to grow a boule at a rate of about 1-5 mm/day. Difficulties during single crystal growth arise from the segregation of the material constituents during growth, which reduces yield and limits crystal size. The present disclosure addresses the issues associated with single crystal growth by treating the material as a ceramic.

Ceramic scintillators are polycrystalline structures that exhibit a degree of optical clarity similar to single crystals, but often at a reduced effective light yield proportional to the loss of clarity, with the tradeoff being the benefit of a shortened time to produce and increased material ruggedness. For the ceramic treatment of lithium indium diselenide and the like, although the source material is identical to that of single crystal growth, the source material is loaded into a die or mould as opposed to a quartz ampule. Through a HIP process held at elevated temperature for a given period of time, many single crystals of differing orientations may form throughout the material and minimize grain boundaries and non-adhered source material. The resulting pressed material exhibits scintillation properties substantially identical to single crystal growth, given the intrinsic property of the chemical compound, with an acceptable decrease in light output, but at a markedly lower cost due to the time savings associated with pressing versus single crystal growth. Semiconductor operation using this method is typically not feasible due to the lack of a single crystalline structure.

In one exemplary embodiment, the present disclosure provides a method for forming a ceramic radiation detector material, including: pulverizing a source material into a powder, wherein the source material includes a chalcopyrite, such as a lithium-containing chalcopyrite like lithium indium diselenide; applying a mechanical pressure to the powder for a predetermined period of time; holding the powder at an elevated temperature below the melting temperature of the powder for the predetermined period of time; and annealing a resulting pressed pellet formed from the powder, wherein the pressed pellet includes a plurality of crystals with different orientations that collectively exhibit a scintillation behavior of a single crystal of the source material. Optionally, the powder is loaded into a die or mould to which the mechanical pressure is applied. The mechanical pressure is between 1500 psi (10342 kpa) and 4500 psi (31026 kpa). The elevated temperature is between 100° C. and 400° C. The predetermined period of time is between 6 hours and 24 hours. Optionally, the mechanical pressure is applied to the powder in a vacuum of less than 0.1 atm. Optionally, the mechanical pressure and vacuum are held constant while the pressed pellet is allowed to cool to room temperature. Optionally, the pressed pellet is annealed in an inert atmosphere (such as argon) for 6 hours or more at 400° C. Optionally, prior to applying the mechanical pressure, the powder is first packed into a forming mould and compressed at room temperature to increase the density of the powder to about 80% of nominal. Optionally, the elevated temperature is achieved by injecting a heated inert gas (such as argon) into the powder. Optionally, the annealing step initiated by ramping down the mechanical pressure while maintaining the elevated temperature. Preferably, the mechanical pressure is about 2000 psi (13790 kpa) and the elevated temperature is about 300° C., for example.

In another exemplary embodiment, the present disclosure provides a ceramic radiation detector material formed by the process, including: pulverizing a source material into a powder, wherein the source material includes a chalcopyrite, such as a lithium-containing chalcopyrite like lithium indium diselenide; applying a mechanical pressure to the powder for a predetermined period of time; holding the powder at an elevated temperature below the melting temperature of the powder for the predetermined period of time; and annealing a resulting pressed pellet formed from the powder, wherein the pressed pellet includes a plurality of crystals with different orientations that collectively exhibit a scintillation behavior of a single crystal of the source material. Optionally, the powder is loaded into a die or mould to which the mechanical pressure is applied. The mechanical pressure is between 1500 psi (10342 kpa) and 4500 psi (31026 kpa). The elevated temperature is between 100° C. and 400° C. The predetermined period of time is between 6 hours and 24 hours. Optionally, the mechanical pressure is applied to the powder in a vacuum of less than 0.1 atm. Optionally, the mechanical pressure and vacuum are held constant while the pressed pellet is allowed to cool to room temperature. Optionally, the pressed pellet is annealed in an inert atmosphere (such as argon) for 6 hours or more at 400° C. Optionally, prior to applying the mechanical pressure, the powder is first packed into a forming mould and compressed at room temperature to increase the density of the powder to about 80% of nominal. Optionally, the elevated temperature is achieved by injecting a heated inert gas (such as argon) into the powder. Optionally, the annealing step initiated by ramping down the mechanical pressure while maintaining the elevated temperature. Preferably, the mechanical pressure is about 2000 psi (13790 kpa) and the elevated temperature is about 300° C., for example.

BRIEF DESCRIPTION OF THE DRAWINGS

The present disclosure is illustrated and described herein with reference to the various drawings, in which like reference numbers are used to denote like method steps/device components, as appropriate, and in which.

DETAILED DESCRIPTION OF THE DISCLOSURE

Several processes may be used to form lithium indium diselenide ($LiInSe_2$) crystals or ceramic pressed material or pellets. Disclosed herein are two exemplary methods for rapidly creating pressed ceramic compounds of $LiInSe_2$ and the like that advantageously scintillate substantially identically to the single crystal forms. $LiInSe_2$ powder may be compacted into ceramic compounds using die press or HIP processes. Although the pressed ceramic forms of the source materials exhibit decreased light output as compared with the single crystal forms, the time required to form the pressed materials is much less than the slower growth process for the single crystals.

Figure 1:
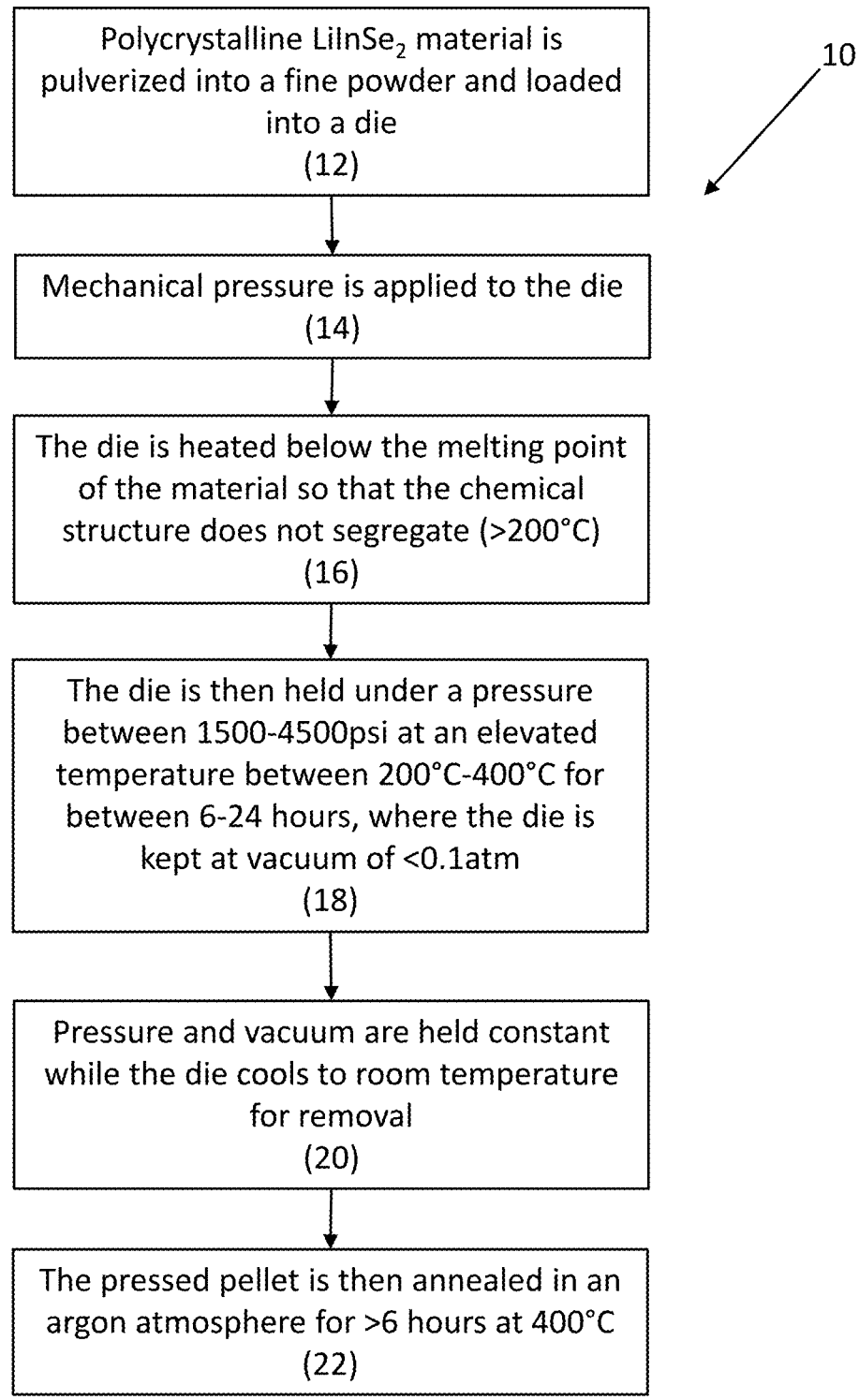
FIG. 1 is a flowchart illustrating a die press process for the formation and pressing of a lithium indium diselenide or like ceramic material, in accordance with the present disclosure.
Figure 3:
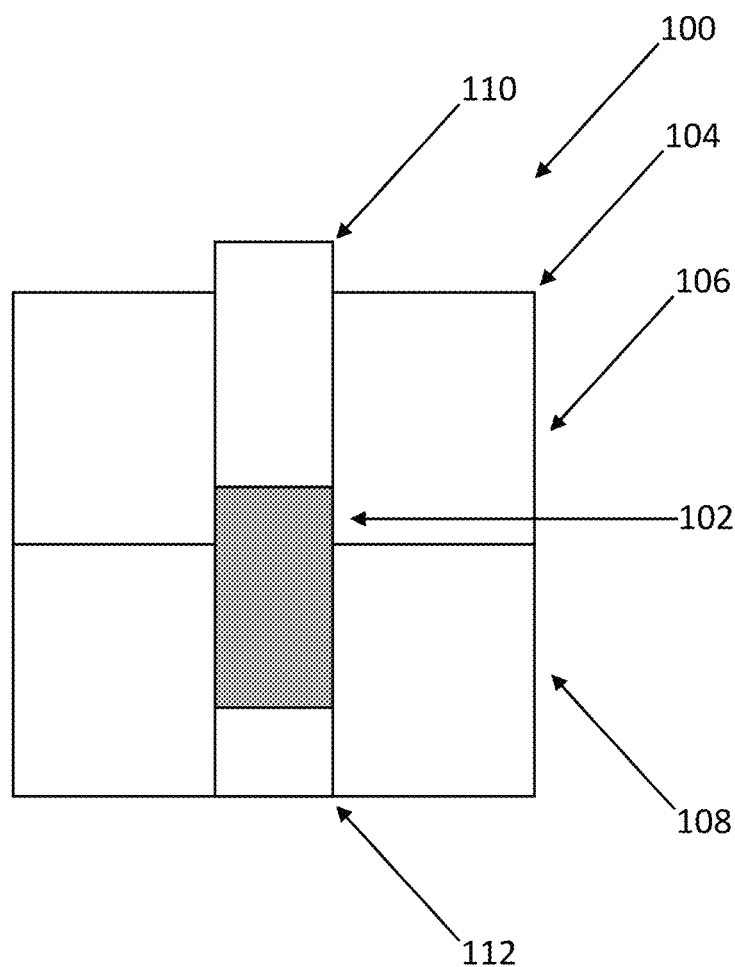
FIG. 3 is a schematic diagram illustrating an exemplary die apparatus that may be used in the die press process of the present disclosure.
Figure 4:
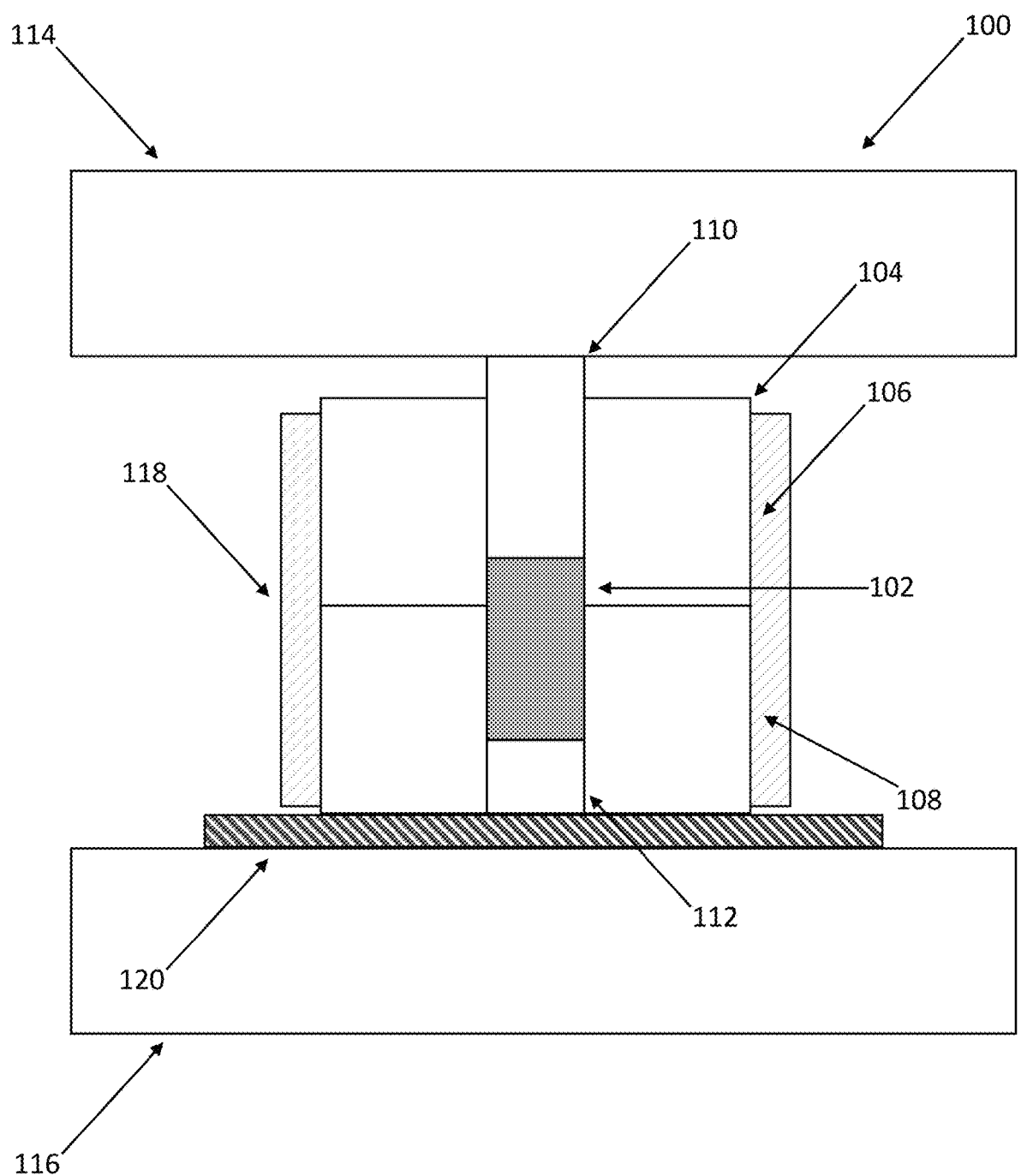
FIG. 4 is a schematic diagram illustrating an exemplary die/die press apparatus that may be used in the die press process of the present disclosure.

In a die press process, such as the example provided in FIG. 1, mechanical pressure is applied through hydraulic or other means to the top and bottom of the die, where the sides of the die are effectively rigid and inflexible under the pressure. An exemplary die and die press are illustrated in FIGS. 3 and 4. In general, the die may be heated below the melting point of the material such that the chemical structure does not segregate into $InSe_3$ or other possible alternative components. The minimum temperature depends on the pressure, but preferably the temperature is greater than about 200° C. The die is then held under a pressure ranging from about 1500 psi (10342 kpa) to about 4500 psi (31026 kpa) at the elevated temperature for a given time period. The temperature may range from about 200° C. to about 400° C. The time period may range from about 6 to about 24 hours. A vacuum may remove the majority of oxygen from surrounding areas and voids within the material. Thus, the die may be kept at vacuum of less than about 0.1 atm to prevent the constituents from oxidizing at the elevated temperatures. The vacuum may be maintained while heat is applied. The pressure and vacuum may be held constant while the die cools to room temperature for removal. The pressure may be independent while the material heats up, but preferably pressure is maintained during cooling to restrict the possibility of relaxation or axial growth. The material may be removed from the die as a pressed pellet. The pressed pellet may then be annealed in an atmosphere of an inert gas for more than about 6 hours at 400° C. Any inert gas may be used, but to prevent filling any voids within the material such as helium might a heavier, larger atom size may be preferable, such as argon, for example.

Referring to FIGS. 1, 3, and 4 specifically, the method 10 and forming apparatus 100 include: first, pulverizing a polycrystalline $LiInSe_2$ material 102 into a fine powder and loading the material 102 into a die 104 including a top portion 106, a bottom portion 108, a top plunger 110, and a bottom plug 112 (12); applying mechanical pressure to the die 104 using a top press 114 that acts on the top plunger 110 and a bottom press 116 that supports the bottom plug 112 (14); heating the die 104 below the melting point of the material 102 so that the chemical structure does not segregate (>200° C.) using a heating element 118 and thermal insulation 120 coupled to the die 104 (16); holding the die 104 under a pressure of between 1500 psi (10342 kpa) and 4500 psi (31026 kpa) at the elevated temperature of between 200° C. and 400° C. for between 6 and 24 hours with the die kept at vacuum of <0.1 atm (18); holding the pressure and vacuum constant while the die 104 cools to room temperature for removal (20); and, finally, annealing the pressed pellet in an inert atmosphere (such as argon) for >6 hours at 400° C. (22). It will be readily apparent to those of ordinary skill in the art that this process may be varied slightly and that any suitable die/press assemblies may be utilized equally.

Figure 2:
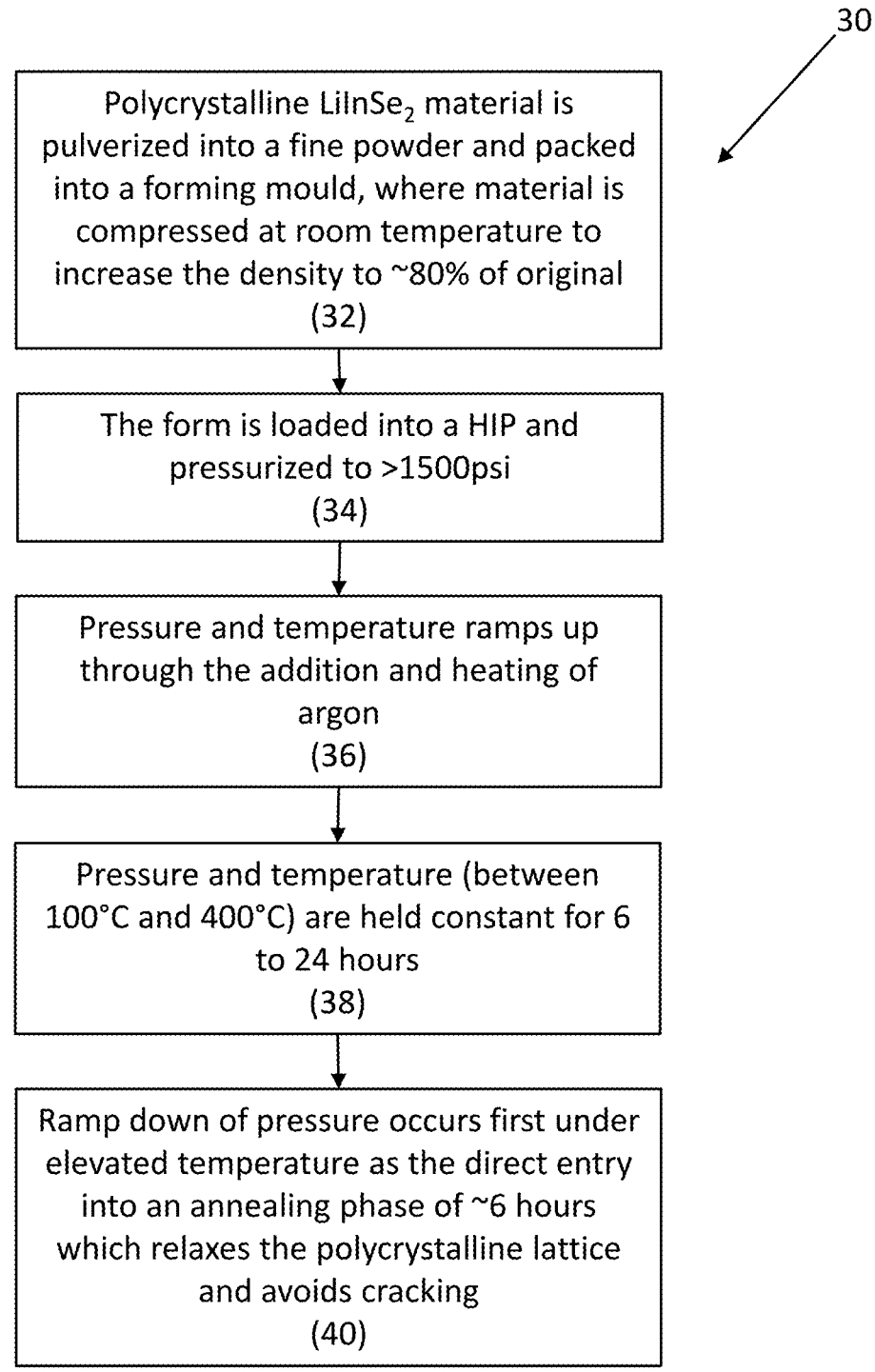
FIG. 2 is a flowchart illustrating a HIP process for the formation and pressing of a lithium indium diselenide or like ceramic material, in accordance with the present disclosure.

In a hot isostatic press (HIP) process, such as the example provided in FIG. 2, a forming mould may be packed tightly with powder to control the shape of the resulting ceramic. The material may be compressed in a press at room temperature such that the density is increased to about 80% of nominal. Again, an exemplary die and die press are illustrated in FIGS. 3 and 4. Thin, flat, or slab shapes may be preferred for neutron detection, since the lithium absorber will effectively self-shield after some thickness. The grain size diameter of the powder may range from about 1 µm to about 1 mm. The form may be loaded into a HIP and pressurized to more than about 1500 psi (10342 kpa). The pressure and temperature may be ramped up through the addition and heating of an inert gas (such as argon). The temperature may range from about 100° C. to about 400° C. The pressure and temperature may be held constant for a time period ranging from about 6 hours to about 24 hours. Ramping down of the pressure may occur first under the elevated temperature as the direct entry into an annealing phase of approximately 6 hours, which relaxes the polycrystalline lattice and avoids cracking.

Referring to FIGS. 2-4 specifically, the method 30 and forming apparatus 100 include: first, pulverizing a polycrystalline $LiInSe_2$ material into a fine powder and packing the material into a forming mould, where material is compressed at room temperature to increase the density to ~80% of nominal the original density (32); loading the form into the HIP 104 and pressurizing the form to >1500 psi (10342 kpa) (34); ramping up the pressure and temperature through the addition and heating of an inert gas (such as argon) (36); holding the pressure and temperature (between 100° C. and 400° C.) constant for 6 to 24 hours (38); and, finally, ramping down the pressure—first under elevated temperature as the direct entry into an annealing phase of ~6 hours, which relaxes the polycrystalline lattice and avoids cracking (40). Again, it will be readily apparent to those of ordinary skill in the art that this process may be varied slightly and that any suitable die/press assemblies may be utilized equally.

Thus, the ceramic material of the present disclosure may be formed utilizing source material. The source material may be produced by various methods where the source material stoichiometry is controlled and synthesized into the correct chemical formula, including the method described in U.S. Pat. No. 9,334,581, for example, the disclosure of which is fully incorporated herein by reference. Similar ceramic source materials may also be used, incorporating various co-dopants, etc. Material formed as a boule of polycrystalline $LiInSe_2$ material may be pulverized into a fine powder. The powder may then be loaded into either the die or forming mould.

The scintillation properties are intrinsic to the chemical makeup of $LiInSe_2$, so heating does not induce this. However, the heating and post-annealing phases serve to relax mechanical stresses that can inhibit light transmission. In terms of each granule, individuals scintillate with the exact same light creation properties as a large single crystal, and the aggregation of many individual granules is preferred for an increase in "absolute efficiency" with respect to the light readout method.

Absolute efficiency is defined as the number of particles that pass through the detector per the number of particles emitted from a given source. The optimization of this absolute efficiency is gained by increasing detector surface area. Detector efficiency is determined by absolute efficiency and by the "intrinsic efficiency." Intrinsic efficiency is defined as the number of interactions within the volume per the number of particles traversing the volume. Intrinsic efficiency is bounded by the volume of material, where self-shielding of the lithium compound restricts the usefulness of large thicknesses. So the ability to utilize this method to press very large, thin surface areas is a unique and beneficial feature over prior single crystal-based methods.

No binder agent is needed or ordinarily utilized, whereas some ceramics do utilize an epoxy. Multiple grain sizes are often mixed to create a heterogeneous structure that exhibits some cohesive property. Here, no binder agent is necessarily beneficial, but its use cannot be ruled out.

Detectors produced in the manner described herein need to reach a density ~98% of theoretical maximum density (4.47 g) in order to be efficient as a scintillator. This production method does not result in the semiconductor detection mechanism form of $LiInSe_2$.

Fast neutron detectors measure the energy deposited in the material during a scattering event. $LiInSe_2$ is able to utilize lithium metal as the scattering mechanism given the low atomic masses of Li-6 and Li-7. Higher energy neutrons deposit energy through elastic or inelastic scattering, and the Li-6 or Li-7 dissipates this energy through a scintillation mechanism. Higher energies emit greater amounts of light that allow the material to act as a neutron spectrometer above the 150-200 keV lower limit. For large volumes (>0.5 cm thick), the material of the present invention will provide a very compact neutron detector for a CCD array, pixelated array of SiPMs, segmented PMT, and other fast neutron imaging modalities.

Because the pressed ceramic material of the present invention is cost effective to produce (~20% of the cost of single crystal growth) and may assume a small form factor (e.g., 1 $cm^3$ or less), it advantageously enables less costly production of large tiled detector arrays and the like, opening up novel imaging and detection applications at a distance, for example.

Although the present invention is illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following non-limiting claims for all purposes.

What is claimed is:

1. A method for forming a ceramic radiation detector material, comprising:
   pulverizing a source material into a powder, wherein the source material comprises a chalcopyrite;
   applying a mechanical pressure to the powder for a predetermined period of time;
   holding the powder at an elevated temperature below the melting temperature of the powder for the predetermined period of time, wherein the elevated temperature is between 100° C. and 400° C.; and
   annealing a resulting pressed pellet formed from the powder, wherein the pressed pellet comprises a plurality of crystals with different orientations that collectively exhibit a scintillation behavior of a single crystal of the source material.

2. The method of claim 1, wherein the powder is loaded into a die or mould to which the mechanical pressure is applied.

3. The method of claim 1, wherein the mechanical pressure is between $1500_{psi}$ and 4500 psi.

4. The method of claim 1, wherein the predetermined period of time is between 6 hours and 24 hours.

5. The method of claim 1, wherein the mechanical pressure is applied to the powder in a vacuum of less than 0.1 atm.

6. The method of claim 5, wherein the mechanical pressure and vacuum are held constant while the pressed pellet is allowed to cool to room temperature.

7. The method of claim 1, wherein the pressed pellet is annealed in an inert atmosphere for 6 hours or more at 400° C.

8. The method of claim 1, wherein, prior to applying the mechanical pressure, the powder is first packed into a forming mould and compressed at room temperature to increase the density of the powder.

9. The method of claim 1, wherein the elevated temperature is achieved by injecting a heated inert gas into the powder.

10. The method of claim 1, wherein the annealing step is initiated by ramping down the mechanical pressure while maintaining the elevated temperature.

11. A method for forming a ceramic radiation detector material, comprising:
    pulverizing a source material into a powder, wherein the source material comprises a chalcopyrite;
    applying a mechanical pressure to the powder for a predetermined period of time, wherein the predetermined period of time is between 6 hours and 24 hours;
    holding the powder at an elevated temperature below the melting temperature of the powder for the predetermined period of time; and
    annealing a resulting pressed pellet formed from the powder, wherein the pressed pellet comprises a plurality of crystals with different orientations that collectively exhibit a scintillation behavior of a single crystal of the source material.

12. The method of claim 11, wherein the powder is loaded into a die or mould to which the mechanical pressure is applied.

13. The method of claim 11, wherein the mechanical pressure is between 1500 psi and 4500 psi.

14. The method of claim 11, wherein the elevated temperature is between 100° C. and 400° C.

15. The method of claim 11, wherein the mechanical pressure is applied to the powder in a vacuum of less than 0.1 atm.

16. The method of claim 15, wherein the mechanical pressure and vacuum are held constant while the pressed pellet is allowed to cool to room temperature.

17. The method of claim 11, wherein the pressed pellet is annealed in an inert atmosphere for 6 hours or more at 400° C.

18. The method of claim 11, wherein, prior to applying the mechanical pressure, the powder is first packed into a forming mould and compressed at room temperature to increase the density of the powder.

19. The method of claim 11, wherein the elevated temperature is achieved by injecting a heated inert gas into the powder.

20. The method of claim 11, wherein the annealing step is initiated by ramping down the mechanical pressure while maintaining the elevated temperature.

* * * * *